(12) United States Patent
Edwards, IV (10) Patent No.: US 11,946,571 B1
(45) Date of Patent: Apr. 2, 2024

(54) TEMPORARY PIPELINE PROTECTION APPARATUS

(71) Applicant: Allan John Edwards, IV, Tulsa, OK (US)

(72) Inventor: Allan John Edwards, IV, Tulsa, OK (US)

( * ) Notice: Subject to any disclaimer, the term of this patent is extended or adjusted under 35 U.S.C. 154(b) by 592 days.

(21) Appl. No.: 17/148,658

(22) Filed: Jan. 14, 2021

Related U.S. Application Data (60) Provisional application No. 62/961,744, filed on Jan. 16, 2020.

(51) Int. Cl.
| F16L 1/20 | (2006.01) |
| F16L 1/12 | (2006.01) |
| F16L 57/00 | (2006.01) |
| F17D 5/00 | (2006.01) |

(52) U.S. Cl.
CPC .............. *F16L 1/123* (2013.01); *F16L 57/00* (2013.01); *F17D 5/00* (2013.01)

(58) Field of Classification Search
CPC .............. F16L 1/11; F16L 1/123; F16L 57/00
USPC .................................. 405/157, 172, 211, 216
See application file for complete search history.

(56) References Cited

U.S. PATENT DOCUMENTS

| 2,791,019 A * | 5/1957 | Du Laney ................. | F16L 1/24 403/312 |
| 4,421,437 A * | 12/1983 | Langner ................. | F16L 57/02 405/169 |
| 4,439,070 A * | 3/1984 | Dimmick ................. | E02D 5/64 24/271 |
| 4,612,056 A * | 9/1986 | Gibson ............... | E02B 17/0017 405/211 |
| 4,815,896 A * | 3/1989 | Fox ........................ | H01B 7/181 174/136 |
| 5,102,265 A * | 4/1992 | Dokmo ............... | E02B 17/0026 405/195.1 |
| 6,347,911 B1 * | 2/2002 | Blair ........................ | E02D 5/60 52/592.4 |
| 7,017,666 B1 * | 3/2006 | Allen .................... | B63B 21/502 405/211 |
| 9,080,392 B1 * | 7/2015 | Allen ...................... | F16L 1/123 |
| 10,571,066 B2 * | 2/2020 | Meijer .................... | F16L 57/02 |
| 11,339,910 B1 * | 5/2022 | Brown .................. | F16L 58/181 |
| 11,549,633 B1 * | 1/2023 | Dweib .................... | F16F 15/08 |

FOREIGN PATENT DOCUMENTS

KR 101189195 B1 * 10/2012

\* cited by examiner

*Primary Examiner* — Frederick L Lagman
(74) *Attorney, Agent, or Firm* — Head, Johnson, Kachigian & Wilkinson, PC (57) ABSTRACT

A temporary pipeline protection apparatus. The apparatus includes a cylindrical sleeve having a pair of halves, each of the halves having a pair of opposed edges parallel to an axis of the cylindrical sleeve. A first edge of each pair of edges of the halves are connected together by at least one hinge assembly configured to move among a closed position, an installation and removal position, and a shipping and transportation position. A latch is configured to close the cylindrical sleeve at a second edge of each of the edges when in the closed position.

16 Claims, 11 Drawing Sheets

TEMPORARY PIPELINE PROTECTION APPARATUS

CROSS REFERENCE

This application is based on and claims priority to U.S. Provisional Patent Application Ser. No. 62/961,744, filed Jan. 16, 2020 which is incorporated herein in its entirety by reference.

BACKGROUND OF THE INVENTION

Field of the Invention

The present invention is directed to a temporary pipeline protection apparatus and a method of installation and removal of a protection apparatus which is used to protect a pipeline during mechanical work surrounding the pipeline. In particular, the present invention is directed to an apparatus which is installed as a temporary protection to shield or protect the pipeline from damage from machinery, equipment, personnel, or falling rocks or other debris during a work project.

Description of the Related Art

There are thousands of miles of underground pipelines around the world that transport liquids or gases.

Periodically, it may be necessary to access and work on existing underground pipelines. In order to do so, the ground surrounding the existing pipeline is removed with the pipeline remaining in a trench thereby formed.

It is desirable to protect the pipeline from machinery or from personnel striking or damaging the pipeline during the work project. Additionally, it is desirable to protect the pipeline from falling rocks or other debris during the work project.

Once the work project on the pipeline has been completed, the pipeline is covered back with ground.

Damage to a pipeline could release hazardous liquids or gases or injure personnel. In addition, exterior coatings on pipelines might also be damaged during a work project which might negatively affect the integrity of the pipeline.

While it is possible to wrap the pipeline with a temporary coating or build an enclosure around the pipeline, there remains a need to provide a temporary pipeline protection apparatus which may easily be installed around a pipeline and easily removed after work operations have been completed.

There also remains a need to provide a temporary pipeline protection apparatus wherein a single lift point is utilized to lower and enclose the pipeline or to open and remove the apparatus from the pipeline.

DETAILED DESCRIPTION OF THE INVENTION

The embodiments discussed herein are merely illustrative of specific manners in which to make and use the invention and are not to be interpreted as limiting the scope.

While the invention has been described with a certain degree of particularity, it is to be noted that many modifications may be made in the details of the invention's construction and the arrangement of its components without departing from the scope of this disclosure. It is understood that the invention is not limited to the embodiments set forth herein for purposes of exemplification.

FIGS. 1 through 5 illustrate a temporary pipeline apparatus 10 along with a sequential process to install the temporary pipeline protection apparatus 10 on and around a pipeline 12.

The apparatus 10 includes a cylindrical sleeve having and composed of a pair of similar halves 14 and 16 divided through a diameter of the cylindrical sleeve. Each of the sleeve halves 14 and 16 includes a pair of opposed edges parallel to an axis (not shown) of the cylindrical sleeve.

A first edge 18 and 20 of each of the pair of parallel edges of the cylindrical halves 14 and 16, respectively, are connected together by at least one hinge assembly 30 (to be described in detail). The hinge assembly 30 is configured so that the cylindrical sleeve halves 14 and 16 move among a closed operation position (surrounding the pipeline forming a cylinder), a shipping and transportation position, and an installation and removal position (which is shown in FIGS. 1 through 5).

Each of the sleeve halves 14 and 16 also includes a second edge 50 and 52, respectively, which are opposed and parallel to the first edges 18 and 20, respectively.

Figure 6:
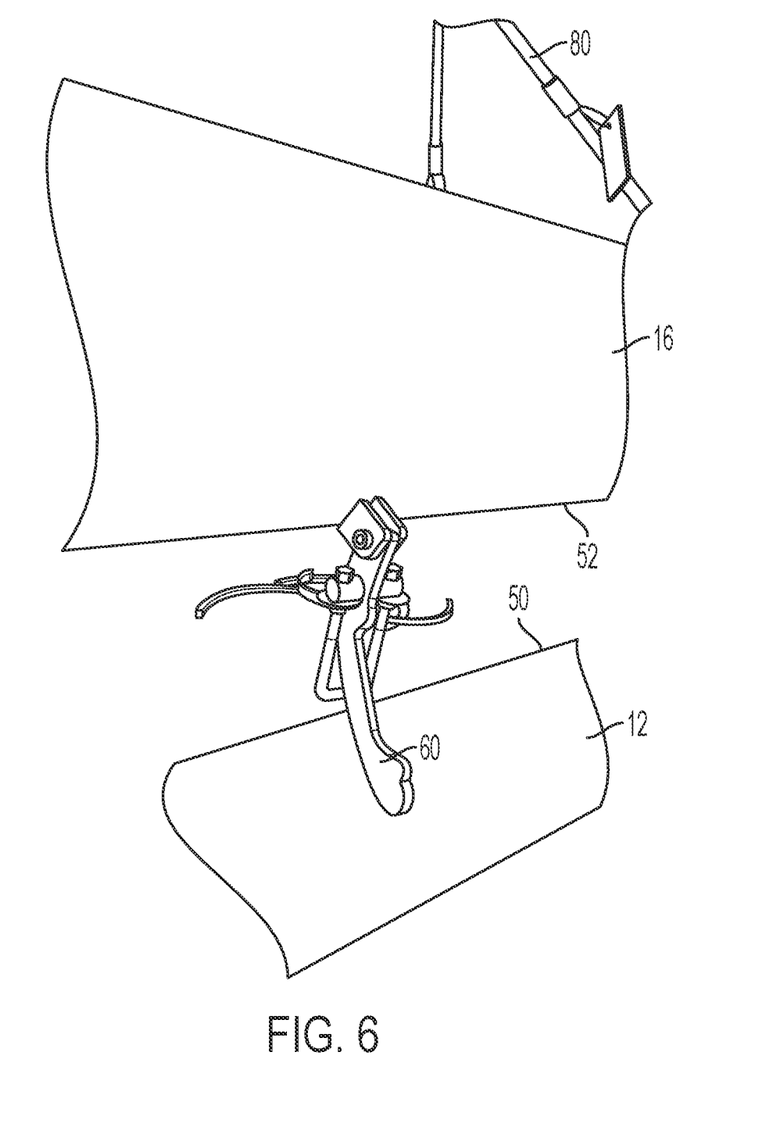
FIG. 6 illustrates an alternate view of the protection apparatus showing latches usable to secure the apparatus in a closed operational position.

As seen in an alternate perspective view in FIG. 6, a latch 60 at the second edges 50 and 52 of the cylindrical sleeve halves 14 and 16, respectively, is in an open position during installation and removal of the apparatus 10. The latch 60 may be utilized to retain the cylindrical sleeve in the closed operational position (to be described).

Figure 7:
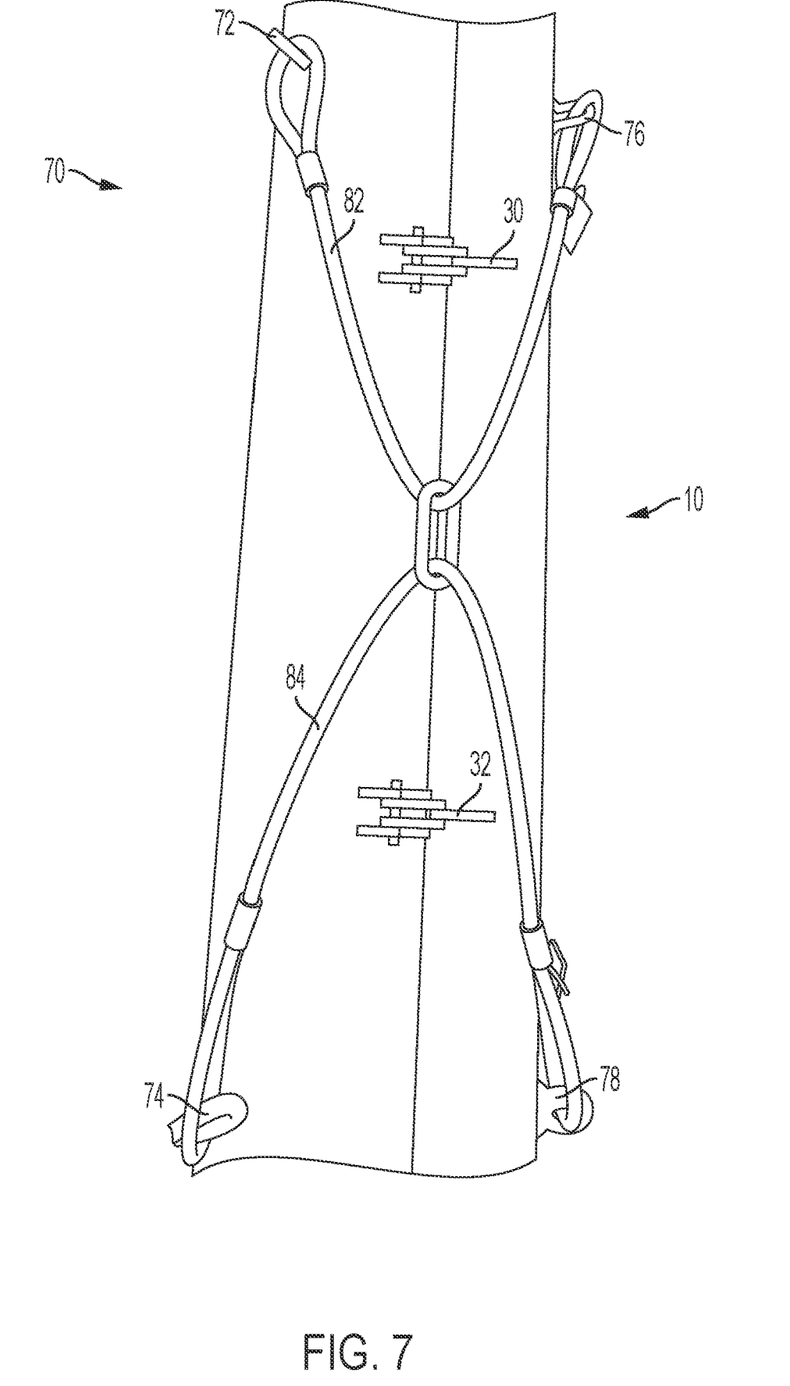
FIG. 7 illustrates an alternate view of the protection apparatus wherein a sling of the apparatus is visible.

The apparatus 10 is shown in FIG. 7 in a shipping and transportation position. The apparatus 10 includes a lift connector system 70 which is utilized to position and lift the apparatus 10 during an installation or removal procedure and while the apparatus is in the installation and removal position as shown in FIG. 1 through 5.

The lift connector system 70 includes a pair of ears 72 and 74 extending from the sleeve halve 14 and a pair of ears 76 and 78 extending from sleeve halve 16. In one non-limiting arrangement, each of the ears 72, 74, 76 and 78 is arranged in angular relationship to axis of the cylindrical sleeve.

A sling apparatus 80 is connected to each of the ears 72, 74, 76 and 78 in order to connect the apparatus 10 to a lift mechanism, such as a tractor tine (seen in FIG. 5), a hook, a shackle, other heavy equipment, or other lifting mechanism.

The sling apparatus 80 may be a unitary device or may be composed of multiple sling segments. In a preferred embodiment, a first sling segment 82 extends between the ears 72 and 76, and a second sling segment 84 extends between the ears 74 and 78. A master link 86 joins the first and second sling segments together or a third sling segment extends between the first two slings. The sling segments 82 and 84 may be composed of wire rope with swaged terminations or sockets or may alternatively be composed of chains or synthetic woven materials.

Figure 8:
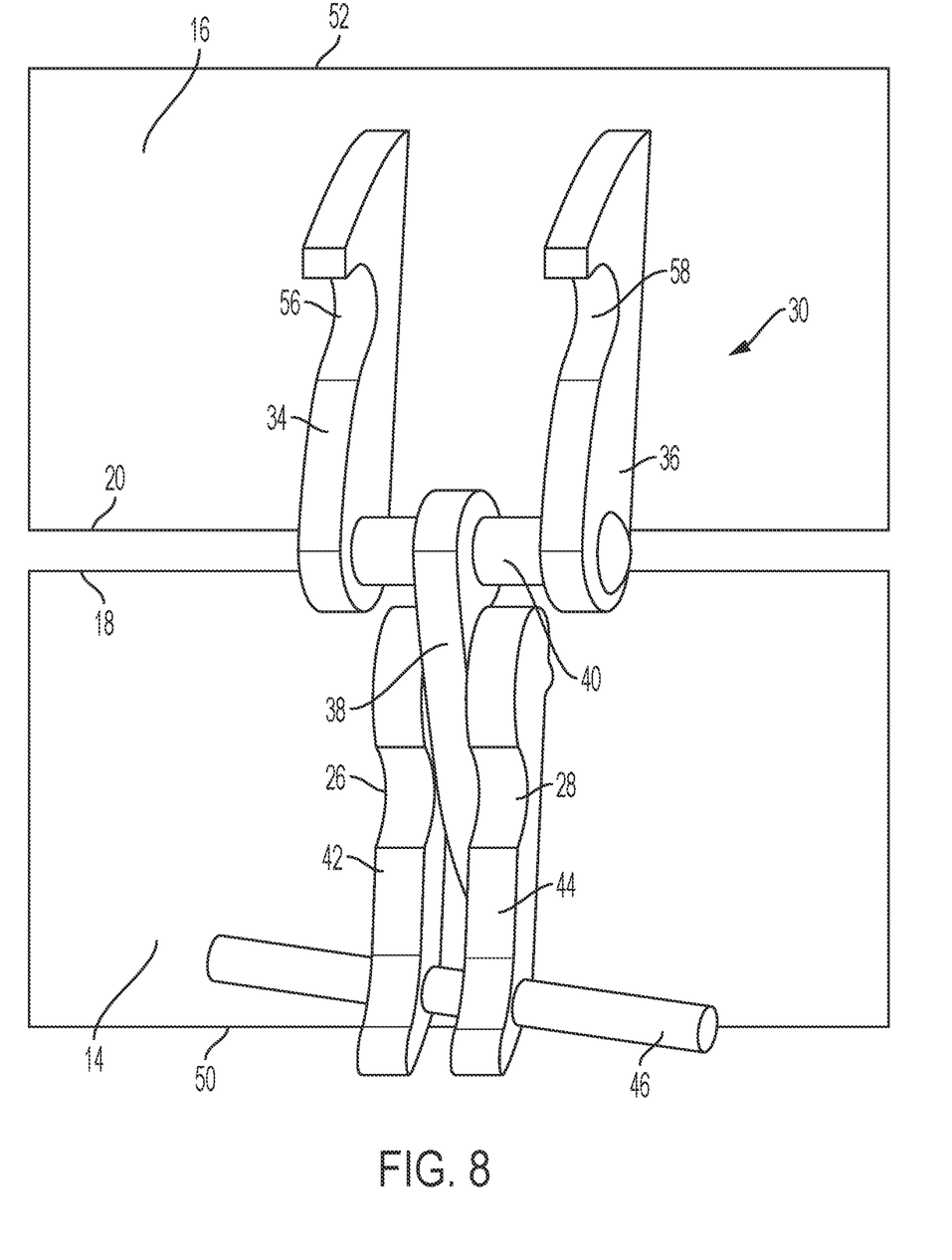
FIGS. 8, 9 and 10 illustrate a hinge assembly of the protection apparatus shown in alternate positions.
Figure 9:
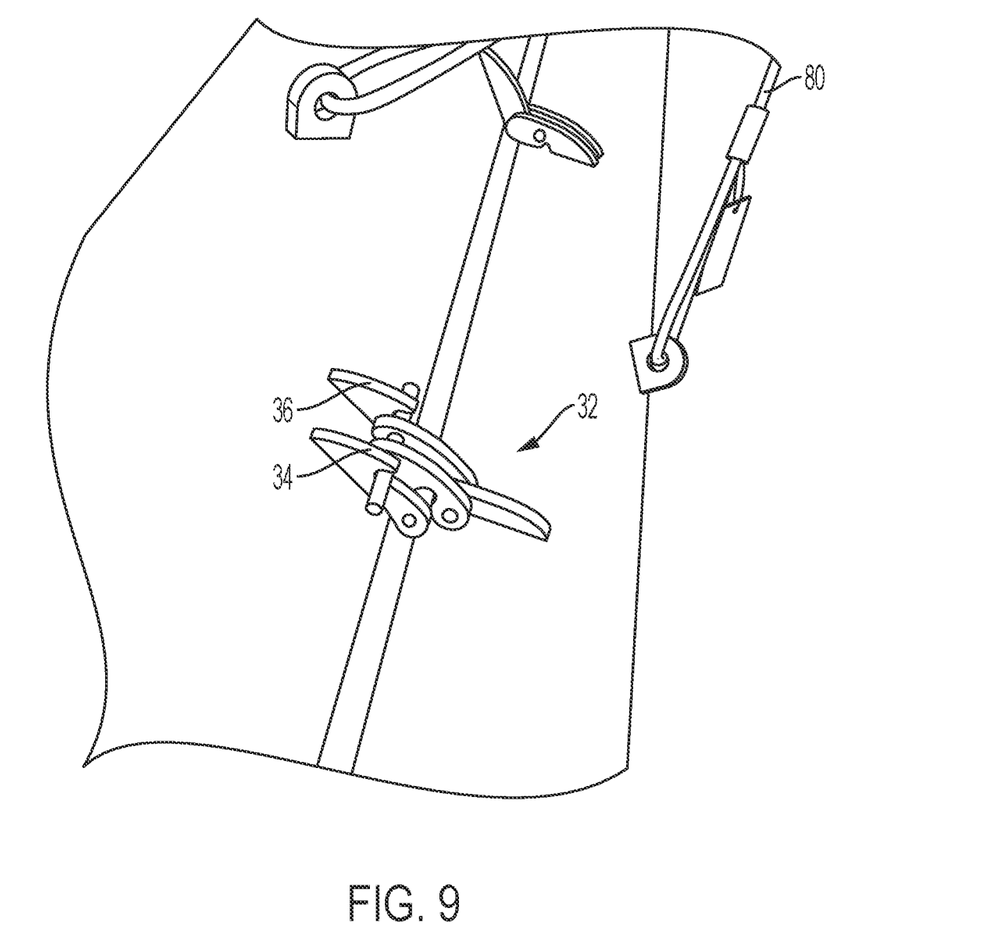
Figure 10:
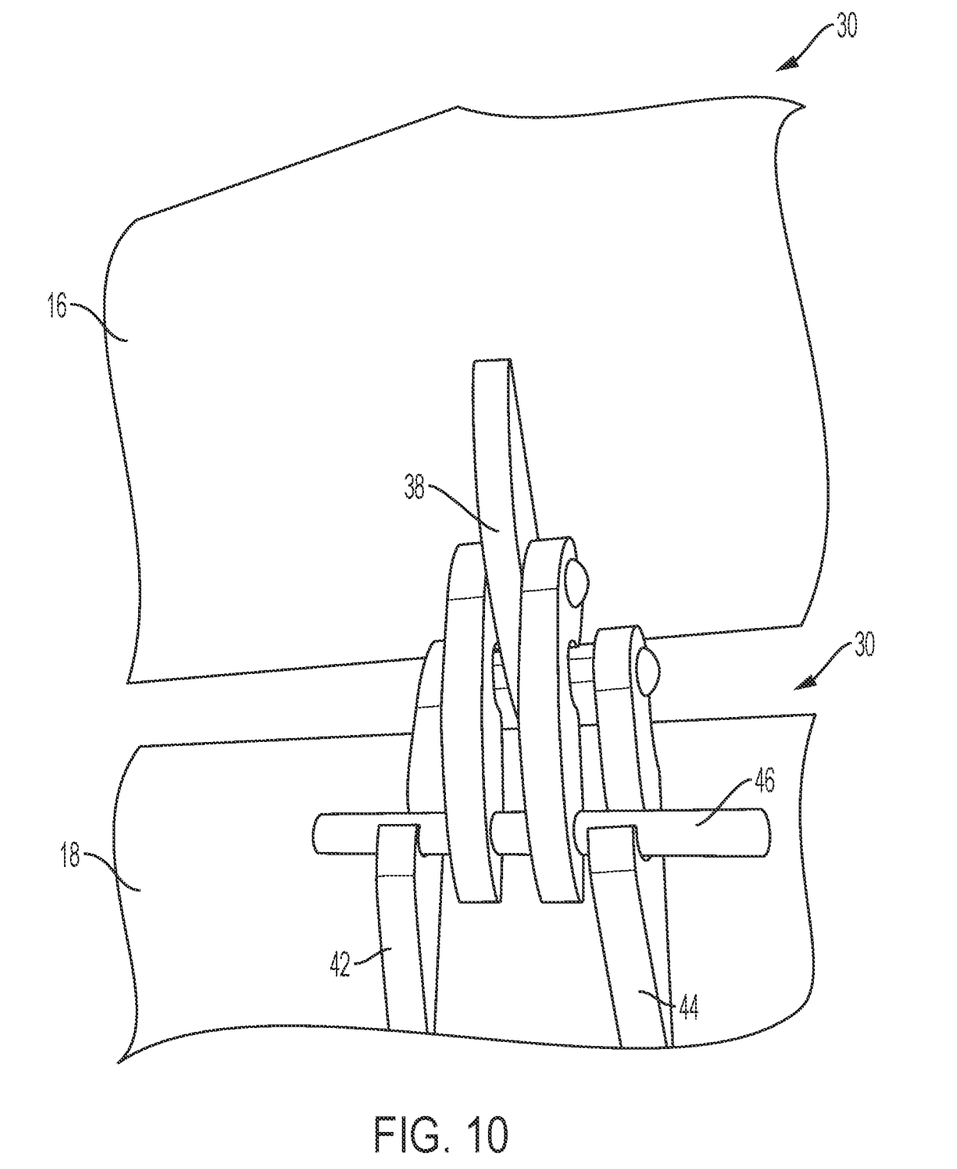

One or more hinge assemblies may be used. In the embodiment shown, two hinge assemblies 30 and 32 and an optional third hinge 48 extend between and join the sleeve halves 14 and 16. FIGS. 8, 9 and 10 illustrate enlarged views of the hinge assembly 30. FIG. 8 illustrates the hinge assembly 30 in a shipping and transportation position, while FIGS. 9 and 10 illustrate the hinge assembly 30 in the installation and removal position.

The ears 72, 74, 76 and 78 are spaced away from the first edges 18 and 20 of the halves so that lifting the apparatus 10 will cause the halves 14 and 16 to rotate toward an installation and removal position.

The hinge assembly 30 includes a pair of first hinge leaves 34 and 36 which are parallel to each other and attached to the sleeve halve 16. A second hinge leaf 38 is attached to the cylindrical sleeve halve 14. The hinge leaves 34, 36 and 38 may be attached by welding or another method. A hinge pin 40 rotatably connects the first hinge leaves 34 and 36 with the second hinge leaf 38 to permit the sleeve halves 14 and 16 to rotate with respect to each other.

A stop bar assembly is rotatably connected to the second hinge leaf 38. The stop bar assembly includes a pair of parallel stop projections 42 and 44 which rotate about a stop pin (not visible in the figures) which also passes through the second hinge leaf 38. The stop bar assembly also includes a stop bar 46 affixed to the pair of stop projections 42 and 44. The stop bar 46 and the stop pin are parallel to the axis of the cylindrical sleeve. The stop projections 42 and 44 may also include optional notches 26 and 28.

The stop bar 46 is movable between the fully open position shown in FIG. 8 and the installation and removal position shown in FIGS. 9 and 10 whereby the stop bar 46 is receivable in slots 56 and 58 in the hinge leaves 34 and 36 respectively. When the stop bar 46 is received in the slots 56 and 58, the sleeve halves 14 and 16 will not be able to rotate past an acute angle to each other.

Figure 1:
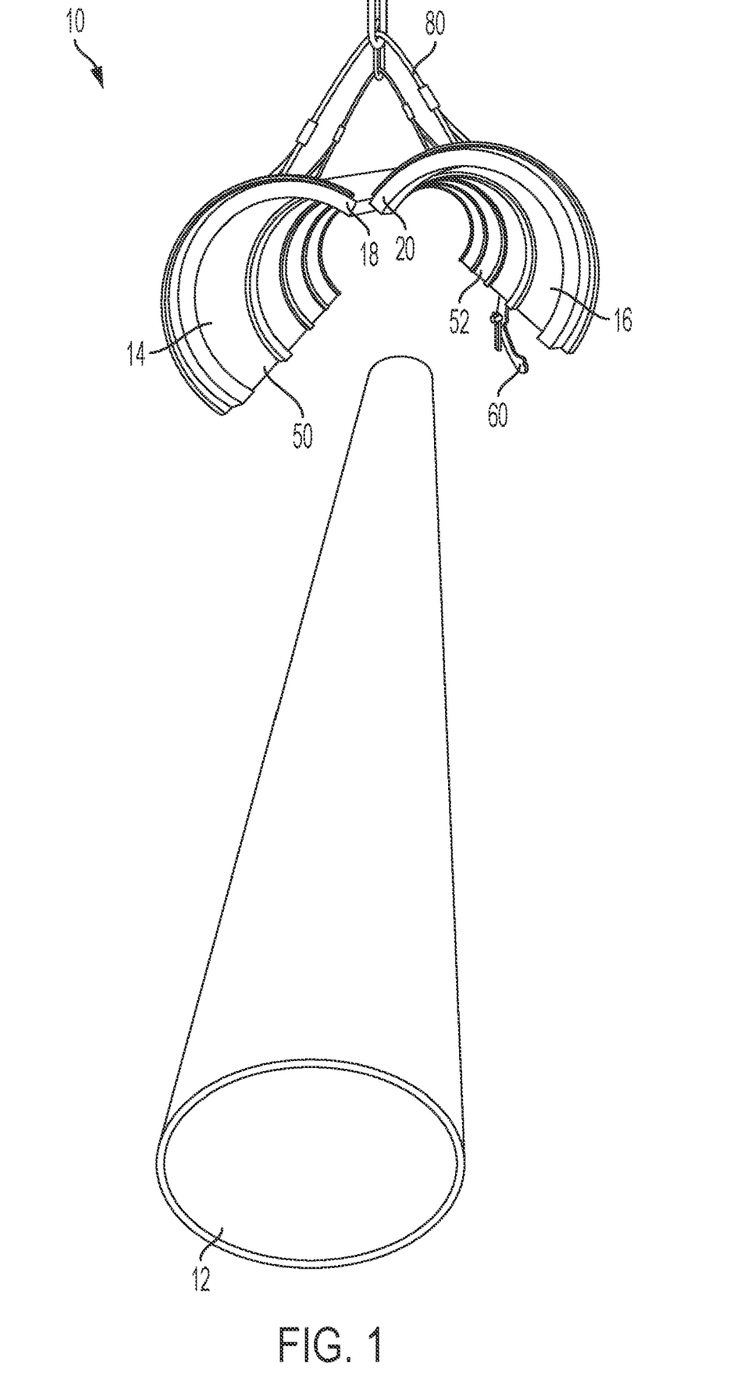
FIGS. 1 through 5 illustrate a temporary pipeline protection apparatus and a sequential process to install a temporary pipeline protection apparatus of the present invention around a pipeline in accordance with the present invention.
Figure 2:
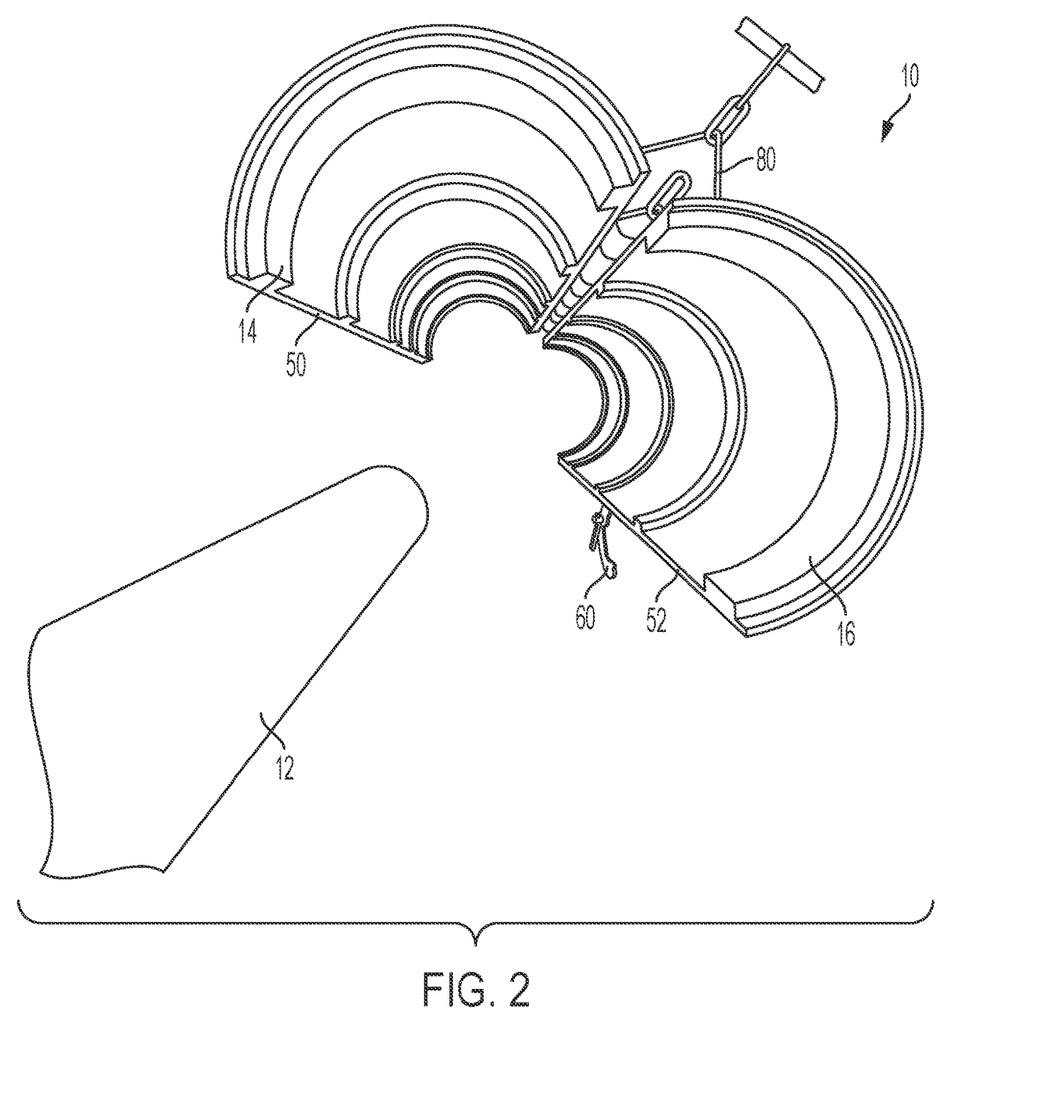
Figure 3:
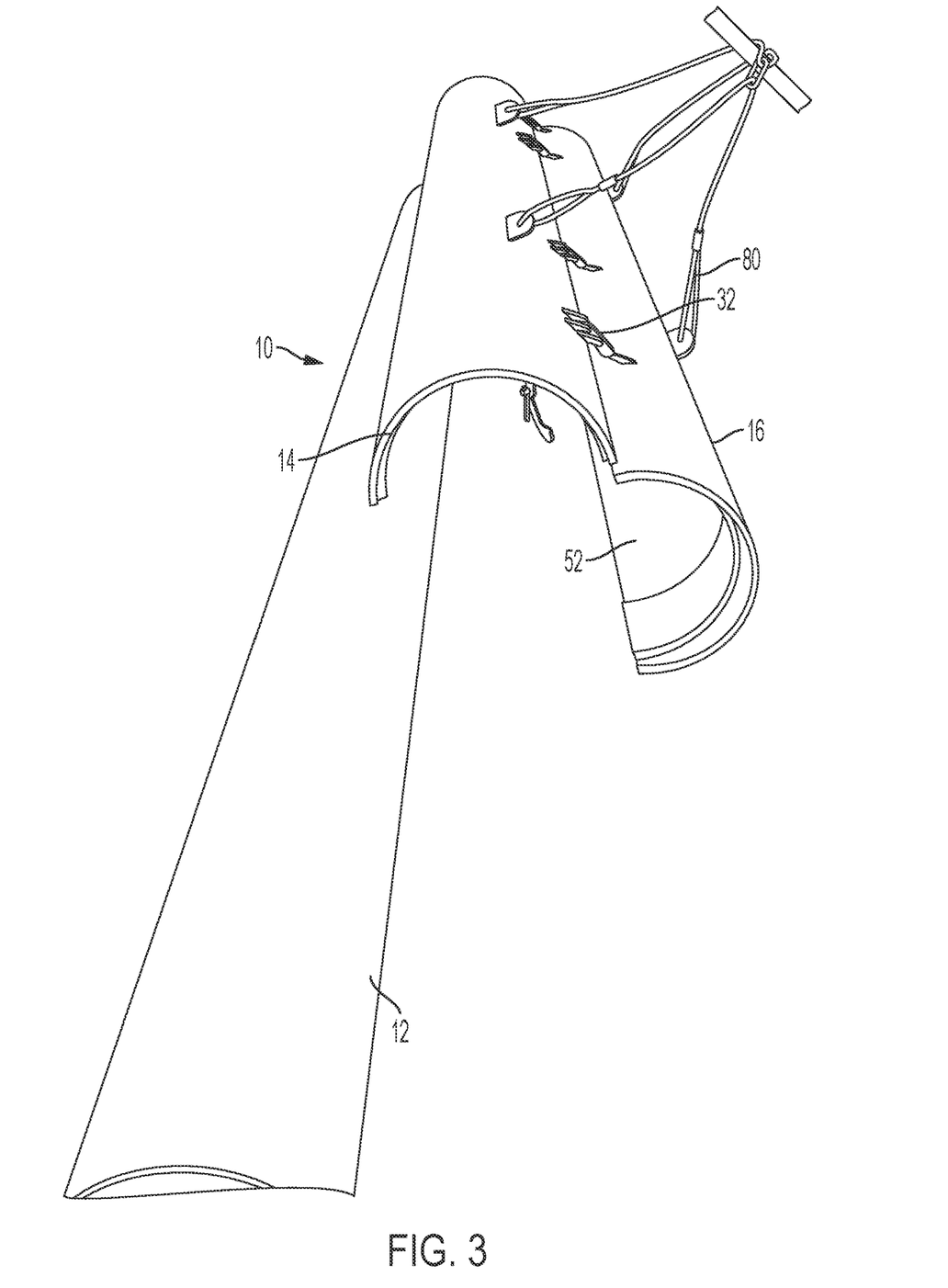

When the apparatus 10 is lifted as shown in FIGS. 1, 2 and 3, the upward force on the sling apparatus 80 will cause the sleeve halves 14 and 16 to rotate about the hinge pin 40 of the hinge assembly 30 with respect to each other so that the sleeve halves 14 and 16 move and rotate toward an open position. The sleeve halves will rotate until the stop bar 46 is engaged in the slots 56 and 58 will prevent the halves 14 and 16 from moving past a point shown in FIGS. 1 and 2. Accordingly, the halves 14 and 16 will remain in the open position so that the space or distance between the second edges 50 and 52 is larger than a diameter of a pipeline 12. Thereafter, upward force on the apparatus will cause the entire apparatus 10 to move upward.

It will be appreciated from the foregoing that a single lift force will open the sleeve halves and lift the apparatus.

Figure 4:
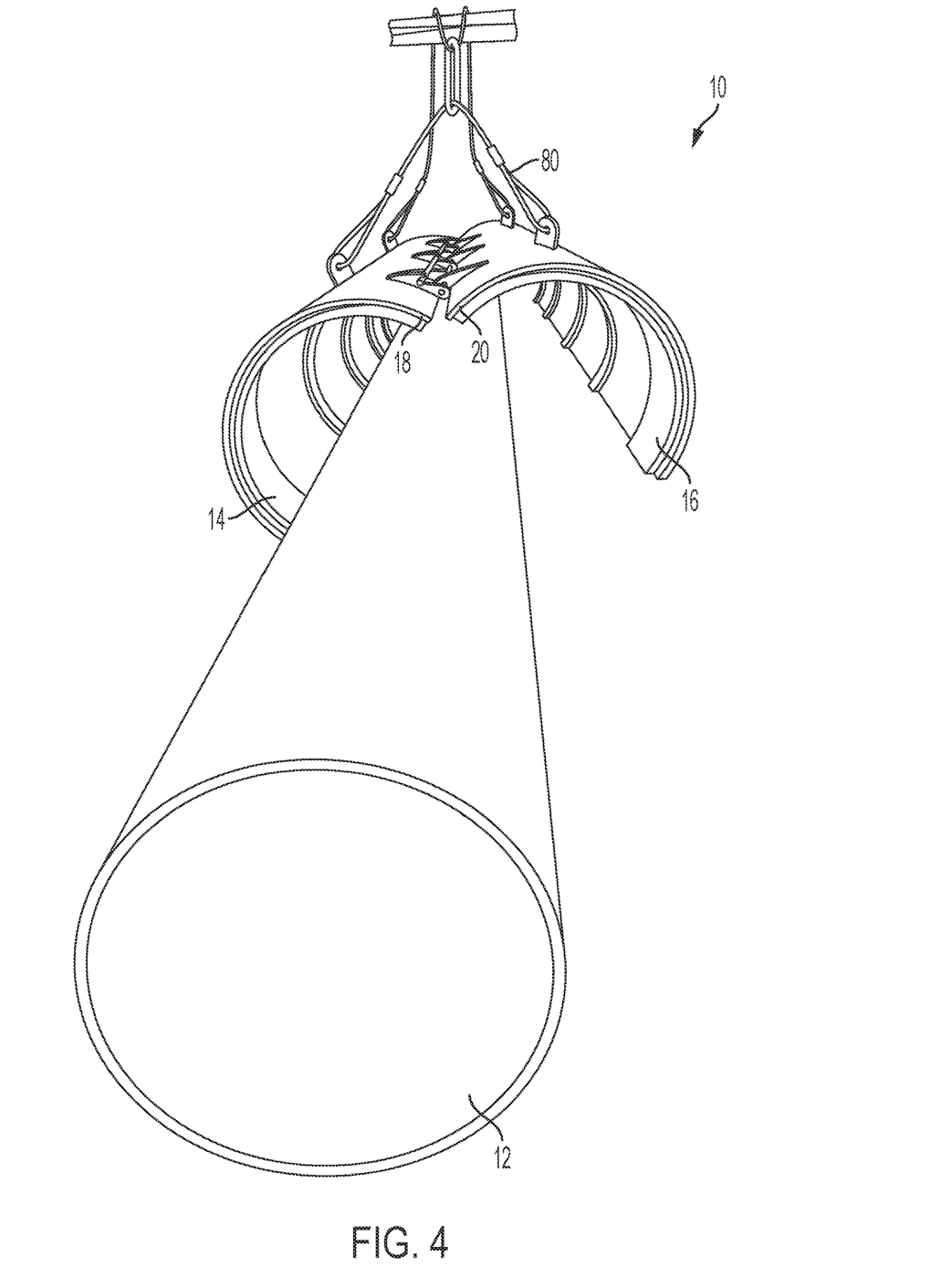
Figure 5:
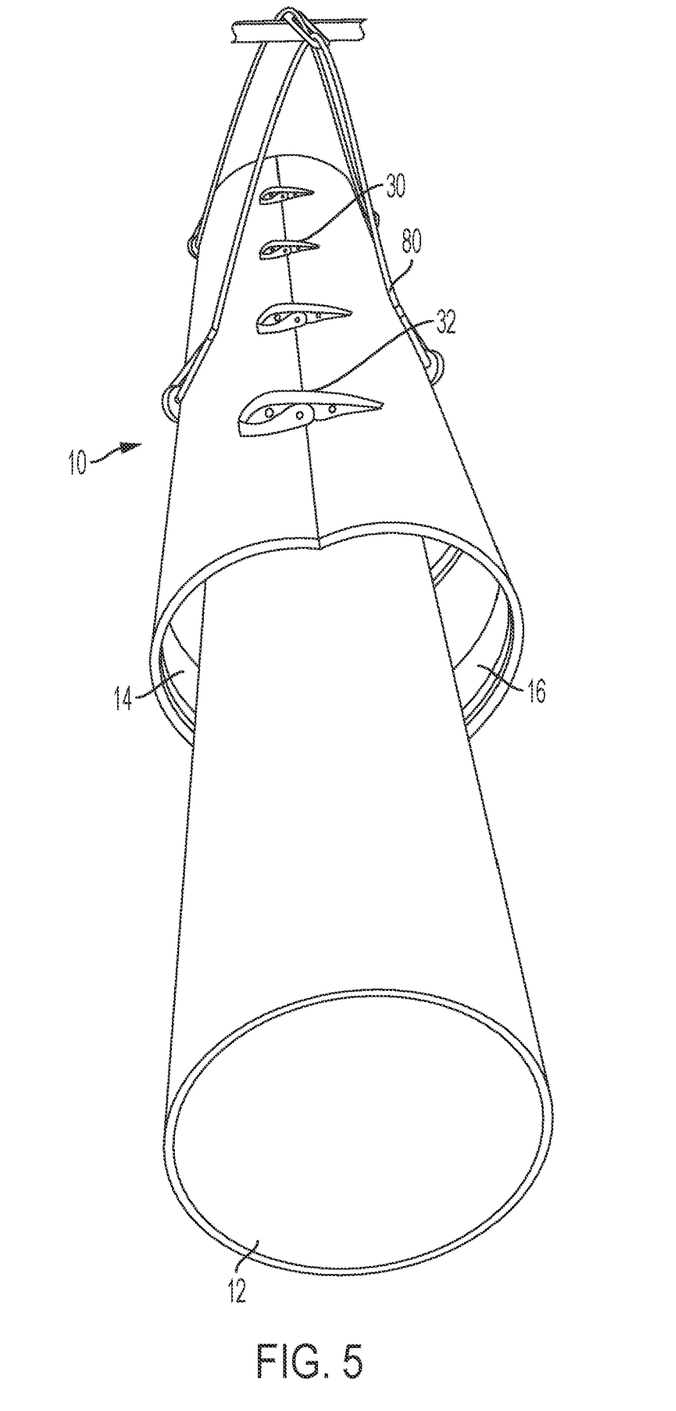

As the apparatus 10 is lowered onto the pipeline, as shown by FIGS. 3, 4 and 5, an inside surface of each of the halves 14 and 16 will engage an upper surface of the pipeline 12. When the inside surfaces of the halves engage the pipeline, the halves are no longer freely suspended. As the halves 14 and 16 continue to be lowered, the edges 50 and 52 of the halves 14 and 16 will begin to rotate about the hinge assemblies 30 and 32 so that the cylindrical sleeve halves 14 and 16 move and rotate toward a closed position surrounding the pipeline 12. Once the halves 14 and 16 have been lowered, the latch 60 will be closed in order to retain the cylindrical sleeve in the closed operational position.

In order to remove the temporary pipeline protection apparatus 10 from the pipeline 12, the reverse procedure will be performed. The latch 60 will be opened. The stop bar projections 42 and 44 and the stop bar 46 are rotated to rest on the first hinged leaves 34 and 36. An upward force is applied to the sling apparatus 80 so that an upward force is applied to the ears 72, 74, 76 and 78. The upward force on the ears will cause the edges 50 and 52 of the sleeve halves 14 and 16 to rotate about the hinge pin 40. The sleeve halves will rotate until the stop bar 46 is engaged. When the stop bar 46 is engaged with slots 56 and 58, the space or distance between the edges 50 and 52 is greater than the diameter of the pipeline.

Figure 11:
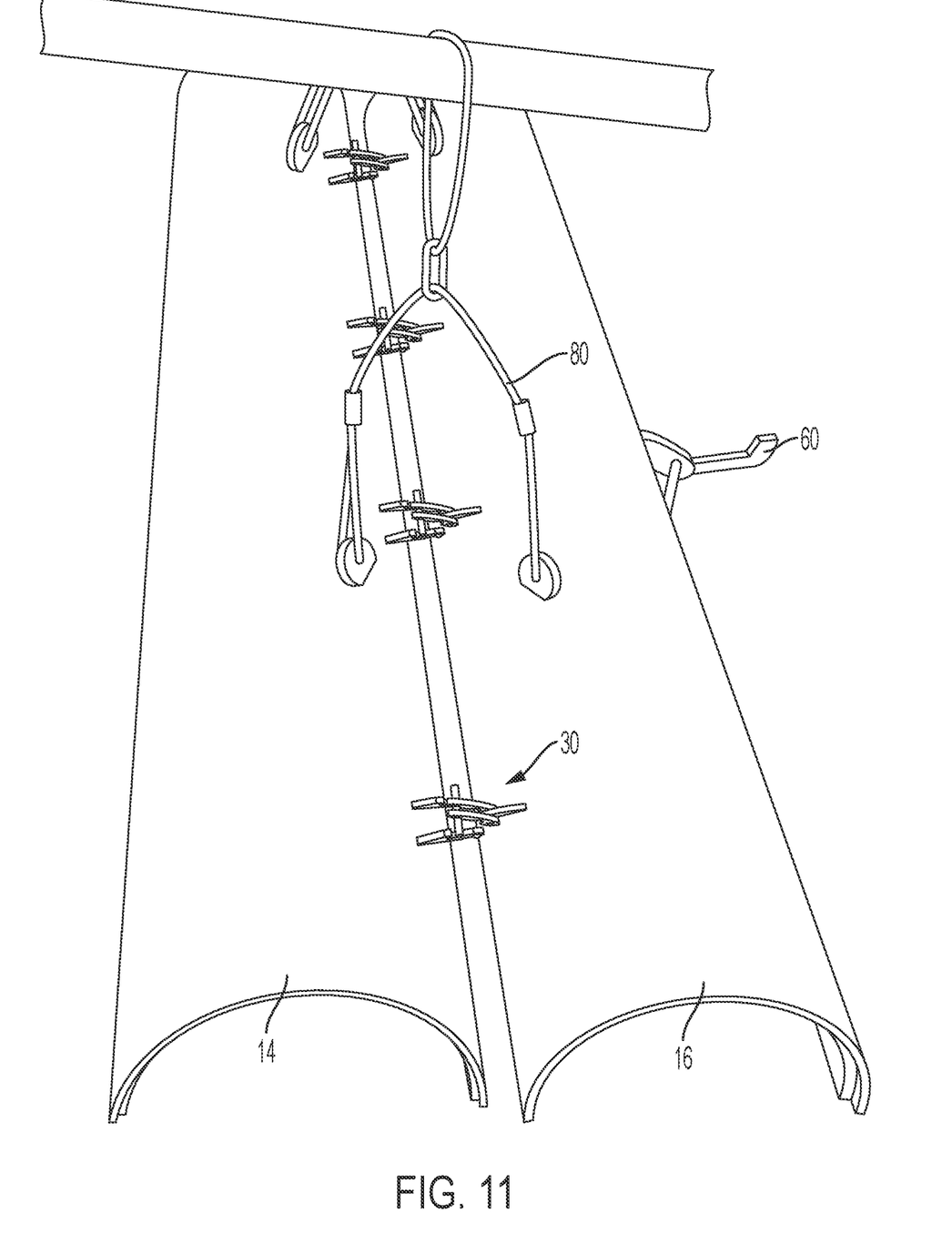
FIG. 11 illustrates the protection apparatus apart from a pipeline in a shipping and transportation position.

FIG. 11 illustrates the apparatus 10 in a shipping and transportation position. The halves 14 and 16 rest in an open orientation. The stop bar 46 will not be engaged with the slots 56 and 58 so that the halves rotate a full 180°. Multiple apparatus may be rested together.

Whereas, the invention has been described in relation to the drawings attached hereto, it should be understood that other and further modifications, apart from those shown or suggested herein, may be made within the scope of this invention.

What is claimed is:

1. A temporary pipeline protection apparatus, which apparatus comprises:
   a cylindrical sleeve having a pair of halves, each of said halves having a pair of opposed edges parallel to an axis of said cylindrical sleeve;
   a first edge of each of said pair of edges of said halves connected together by at least one hinge assembly configured to move among a closed operational position, an installation and removal position, and a shipping and transportation position; and
   a latch configured to close said cylindrical sleeve at a second edge of each of said pair of edges when in said closed operational position;
   wherein each said at least one hinge assembly includes:
   a first hinge leaf attached to one of said halves and includes at least one slot therein;
   a second hinge leaf attached to another of said halves;
   a hinge pin rotatably connecting said first hinge leaf and said second hinge leaf configured to permit rotation of said first hinge leaf and said second hinge leaf; and
   a stop bar assembly rotatably connected to said second hinge leaf, said stop bar assembly receivable in said at least one slot of said first hinge leaf.

2. The temporary pipeline protection apparatus as set forth in claim 1 including a lift connector.

3. The temporary pipeline protection apparatus as set forth in claim 2 wherein said lift connector includes a pair of ears extending from each of said halves and at least one sling connected to each of said ears configured to connect to a lift mechanism.

4. The temporary pipeline protection apparatus as set forth in claim 3 wherein each of said pair of ears is arranged in angular relationship to said axis of said cylindrical sleeve and each of said ears is arranged in angular relationship to each other.

5. The temporary pipeline protection apparatus as set forth in claim 1 wherein one of said pair of ears from one of said halves is connected to one of said pair of ears from another halve.

6. The temporary pipeline protection apparatus as set forth in claim 1 wherein said stop bar assembly includes a pair of stop projections which rotate about a stop pin passing through said second hinge leaf and includes a stop bar affixed to said pair of stop projections, wherein said stop bar and said stop pin are parallel to said axis of said cylindrical sleeve.

7. The temporary pipeline protection apparatus as set forth in claim 1 wherein said first hinge leaf includes a pair of parallel first hinge leaves.

8. The temporary pipeline protection apparatus as set forth in claim 1 wherein said stop bar is receivable in at least one said slot so that said halves are at an acute angle to each other.

9. The temporary pipeline protection apparatus as set forth in claim 1 wherein said cylindrical sleeve has an inner diameter slightly greater than an outside diameter of a pipeline to be protected.

10. The temporary pipeline protection apparatus as set forth in claim 1 wherein said pair of halves nest together with another pair of halves of another cylindrical sleeve when in said shipping and transportation position.

11. A method of installing a temporary pipeline protection apparatus, which method comprises:
  lowering a cylindrical sleeve having a pair of halves, each of said halves having a pair of opposed edges parallel to an axis of said cylindrical sleeve toward a pipeline, while in an installation and removal position;
  engaging an inside surface of each of said pair of halves with said pipeline in order to cause said halves to rotate about at least one hinge assembly connecting a first edge of each of said pair of opposed edges to move said halves toward a closed operational position surrounding said pipeline;
  continuing to lower said cylindrical sleeve until said pair of halves are in said closed operational position surrounding said pipeline; and
  closing a latch at a second edge of each of said pair of edges configured to retain said cylindrical sleeve in said closed operational position;
wherein each said at least one hinge assembly includes:
  a first hinge leaf attached to one of said halves and having at least one slot therein;
  a second hinge leaf attached to another of said halves;
  a hinge pin rotatably connecting said first hinge leaf and said second hinge leaf; and
  a stop bar assembly connected to said second hinge leaf, said stop bar assembly receivable in said slot of said first hinge leaf.

12. The method as set forth in claim 11 wherein said step of lowering said cylindrical sleeve is accomplished with a lift connector having a pair of ears extending from each of said halves and a sling connected to each of said ears configured to connect to a lift mechanism.

13. The method as set forth in claim 12 wherein each of said pair of ears is arranged in angular relationship to said axis of said cylindrical sleeve and each of said ears is arranged in angular relationship to each other.

14. The method of removing a temporary pipeline protection apparatus as set forth in claim 11 wherein said step of raising said pair of halves of said cylindrical sleeve is accomplished with a lift connector having a pair of ears extending from each of said halves and at least one sling connected to each of said ears to connect to a lift mechanism.

15. The method of removing a temporary pipeline protection apparatus as set forth in claim 14 wherein each of said pair of ears is arranged in angular relationship to said axis of said cylindrical sleeve and each of said ears is arranged in angular relationship to each other.

16. A method of removing a temporary pipeline protection apparatus on a pipeline, which method comprises:
  opening at least one latch on a cylindrical sleeve having a pair of halves, each of said pair of halves having a pair of opposed edges, said latch at a second edge of each of said pair of edges;
  raising said pair of halves of said cylindrical sleeve so that said pair of halves rotate about at least one hinge assembly connecting a first edge of each of said pair of edges so that said second edges of said halves separate; and
  continuing to raise said pair of halves of said cylindrical sleeve so that said halves are above and spaced from said pipeline;
wherein each said at least one hinge assembly includes:
  a first hinge leaf and having at least one slot;
  a second hinge leaf;
    a hinge rotatably connecting said first and second leaves; and
  a stop bar assembly connected to said second hinge leaf, said stop bar assembly receivable in said at least one slot.

\* \* \* \* \*